United States Patent [19]

Bauer

[11] 4,076,764
[45] Feb. 28, 1978

[54] EPOXY RESIN COMPOSITION HAVING IMPROVED PHYSICAL PROPERTIES

[75] Inventor: Ronald S. Bauer, Houston, Tex.

[73] Assignee: Shell Oil Company, Houston, Tex.

[21] Appl. No.: 707,909

[22] Filed: Jul. 22, 1976

[51] Int. Cl.$^2$ ............................................. C08L 63/00
[52] U.S. Cl. .............................. 260/834; 260/485 B; 260/837 R
[58] Field of Search ........................................ 260/834

[56] References Cited

U.S. PATENT DOCUMENTS

| | | | |
|---|---|---|---|
| 3,137,666 | 6/1964 | Lox | 260/834 |
| 3,183,117 | 5/1965 | Yuska | 260/834 |
| 3,329,738 | 7/1967 | Hill | 260/834 |
| 3,352,827 | 11/1967 | Sekmakas | 260/834 |
| 3,367,991 | 2/1968 | Hicks | 260/834 |
| 3,393,087 | 7/1968 | Kamp | 260/834 |
| 3,456,035 | 7/1969 | Enders | 260/834 |
| 3,480,692 | 11/1969 | Batzer | 260/834 |

*Primary Examiner*—Paul Lieberman
*Attorney, Agent, or Firm*—Norris E. Faringer

[57] ABSTRACT

The physical properties of heat-cured coatings of saturated epoxy resins are significantly improved by the addition of heat stabilizers (antioxidant) and/or actinic stabilizers.

9 Claims, No Drawings

EPOXY RESIN COMPOSITION HAVING IMPROVED PHYSICAL PROPERTIES

BACKGROUND OF THE INVENTION

Conventional epoxy resins, such as the glycidyl ethers prepared by reacting a dihydric phenol such as 2,2-bis(4-hydroxyphenyl)propane (BPA) with epichlorohydrin in the presence of alkaline medium, when heat-cured with urea-formaldehyde resins, melamine-formaldehyde resins, and the like produce coatings which exhibit good gloss and color. On the other hand, when the saturated epoxy resins derived therefrom are cured with urea-formaldehyde, melamine-formaldehyde resins, anhydrides, etc., the resulting coatings generally exhibit considerable discoloration on overbake. It has now been found that the color and gloss of these cured saturated epoxy resin coatings can be significantly improved by the addition of heat and/or actinic stabilizers.

SUMMARY OF THE INVENTION

The present invention provides a curable composition, which when cured exhibits improved gloss and color, which comprises (1) a saturated epoxy ether of a polyhydric phenol, (2) an epoxy curing agent and (3) at least one heat stabilizer (antioxidant) or actinic stabilizer.

DESCRIPTION OF PREFERRED EMBODIMENT

The present invention is directed to the preparation of cured saturated epoxy resin compositions exhibiting excellent gloss and color retention.

Saturated Epoxy Resins

The epoxy compounds useful in the present compositions include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated bisphenol A", or more properly as the diglycidyl ether of 2,2-bis(4-cyclohexanol) propane.

In any event, the term "saturated epoxy resin", as used herein shall be deemed to mean the glycidyl ethers of polyhydric phenols wherein the aromatic ring structure of the phenols have been or are saturated.

An idealized structural formula representating the preferred saturated epoxy compounds is as follows:

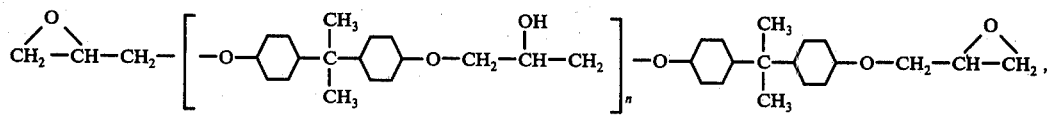

wherein $n$ has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl) propane, sometimes called the diglycidyl ethers of 2,2-bis(4-cyclohexanol) propane.

Epoxy Curing Agents

In general, all conventional epoxy curing agents that are employed in the heat-curing of epoxy resins are suitable for use in the present compositions.

The use of amines as curing agents in baked, or high temperature-curing of epoxy resins, is somewhat limited; however, for some applications some amines, polyamines, etc., such as the polyamides containing carboxyl groups may be employed.

Most suitable curing agents include the polycarboxylic acids and polycarboxylic acid anhydrides. Examples of polycarboxylic acids include the di-, tri- and higher carboxylic acids such as oxalic acid, phthalic acid, terephthalic acid, succinic acid, alkyl and aklenyl-substituted succinic acids, tartaric acid, polymerized fatty acids and the like. Examples of suitable polycarboxylic acid anhydrides include, among others, pyromellitic anhydride, phthalic anhydride, succinic acid anhydride, and maleic acid anhydride. Other suitable catalysts include boron trihalide and complexes of boron trihalide with amines, ethers, phenols and the like; Friedel-Crafts metal salts, such as aluminum chloride, zinc chloride, and other salts, such as zinc fluoborate, magnesium perchlorate and zinc fluorosilicate; inorganic acids and partial esters as phosphoric acid and partial esters thereof including n-butyl orthophosphite, diethyl orthophosphate and hexaethyltetraphosphate and the like.

Preferred curing agents include the so-called amino resins or amino-plasts containing —$NH_2$ groups derived from urea and melamine. Suitable amino-containing resins are prepared by reacting urea or melamine with formaldehyde under well-known conditions to form a reaction monomer first and then, by condensation polymerization, a large number of varying types of polymeric intermediates are formed. The preparation of urea-formaldehyde and melamine-formaldehyde resins is well-known in the art and forms no part of the present invention. Their use in crosslinking epoxy resins mostly through methylol groups is also well-known. Accordingly, a large number of aminoplast and phenoplast resins, i.e., urea-formaldehyde and melamine-formaldehyde resins, are commercially available under such trade designations as Plaskon, Beetle, Cymel, Fiberite, Resimene, Curacron and Beckamine, among many others.

Other suitable curing agents include the hydroxyl- and/or carboxyl-functional acrylic resins such as those marketed under the trade designation Acryloid ® Resins.

Stabilizers

Suitable stabilizers useful in the present compositions include the so-called "heat" stabilizers or antioxidants (Group I) and "actinic" stabilizers (Group II).

Representative antioxidants of the "heat" category (Group I) include the sterically hindered phenols, sulfides and amines as well as the dialkyl esters of beta thiodipropionic acid.

The preparation of suitable antioxidants and thermal stabilizers of Group II are described in U.S. Pat. Nos. 3,285,855, 3,330,859 and 3,441,575.

One suitable "heat" stabilizer of Group I is a stabilizer of the general formula:

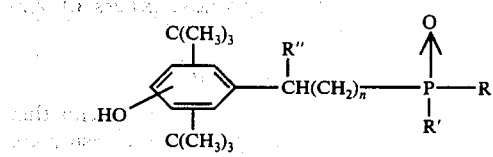

wherein R and R' are the same or different alkoxy groups containing from 12 to 24 carbon atoms, R" is hydrogen or an alkyl having 1 to 6 carbon atoms and $n$ is an integer having a value 0, 1, 2 or 3.

Still other heat stabilizers (antioxidant) include the dialkyl esters of beta thiodipropionic acid wherein the alkyl group contains from 12 to 30 carbon atoms, as in preferably dilauryl thiodipropionate (DLTP) or distearyl thiodipropionate (DSTP).

Suitable stabilizers (ultra-violet absorbers) of Group II include compounds of the general formula:

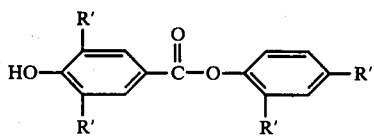

Other suitable stabilizers include the 2-(2-hydroxy-3,5-dialkylphenyl) chlorobenzotriazole, having the general formula:

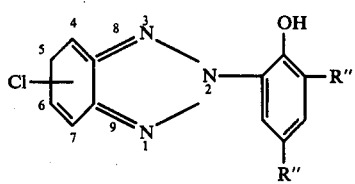

wherein the chlorine atom is attached to either the 4, 5, 6 or 7 carbon atom of the benzotriazole moiety. In the above Formulae (a) and (b) R' represents a tertiary alkyl radical of from 3 to 8 carbon atoms and more particularly a tertiary butyl radical. The preferred position for the chlorine atom is on the 5 carbon atom. Preferred chlorobenzotriazoles are those described in U.S. Pat. Nos. 3,004,896 and 3,189,615 and marketed under the trade designation of Tinuvin ® 327 and Tinuvin ® 326 such as 2-(3,5-di-tert-butylphenyl-2'-hydroxy-)-5-chlorobenzotriazole and 2-(3-tert-butyl-2'-hydroxy-5-methylphenyl)-5-chlorobenzotriazole, repectively.

The formulation of heat-curable or "baked" coatings is well-known. Simply, the resin or resins are usually dispersed with one or more additives such as pigments, fillers, thixotropic agent, flow control agents, and the like, by suitable techniques such as by roller mill. When the roller mill grind dispersion has the proper particle size range, i.e., from about 20 microns to about 5 microns, the resin/pigment dispersion is mixed with one or more curing agents such as the aminoplast resins, solvent and, optionally, a curing catalyst such as para-toluene-sulfonic acid (PTSA), phosphoric acid or cyclohexane sulfamic acid. The resulting enamel is then applied to the substrate by any suitable means such as dipping, spraying, rolling, brushing, or doctor blade. The coating is then baked for from about 5 minutes to about 20 minutes at a temperature from about 350° C to about 400° C. In the present compositions, the stabilizers are preferably added to the resin and pigments to prepare the roller mill dispersion.

In general, the stabilizers are employed in amounts from about 0.01 to about 5.0 phr (parts per one hundred parts by weight of saturated epoxy resin).

The amount of pigment employed is usually in amount to produce a pigment to binder weight ratio in the final enamel of from about 25:75 to about 75:25, with about 40:60 to 60:40 being preferred. A pigment to binder (resin plus curing agent) ratio of 50:50 is very suitable. A catalyst such as p-toluenesulfonic acid (PTSA) in 50% isopropyl alcohol (IPA) may be employed in amounts from about 0.1 to about 5.0 phr.

In general, a curing amount of curing agent is employed, i.e., a stoichiometric amount, although up to 25% excess of either epoxy resin or curing agent (aminoplast) may be employed under such circumstances.

Suitable solvents include ketones, such as acetone, methyl ethyl ketone and methyl isobutyl ketone; alcohols, such as methanol, ethanol, isopropanol, and the like; glycols, glycol ethers and glycol esters; hydrocarbons such as benzene, toluene, xylene, mineral spirits, naphthas, and the like. The solvent component may be a mixture.

The following examples illustrate the preparation of the present epoxy compositions and are for the purpose of illustration only and are in no way intended to limit the invention to the particular compositions illustrated. Modifications within the spirit and scope of the present invention will become apparent to those skilled in the coatings art. Parts and percentages are by weight unless otherwise noted.

The following compounds, resins, curing agents, etc., used in the illustrative embodiments are as follows:

1. Saturated Epoxy Resin A (Resin A): a diglycidyl ether of hydrogenated 2,2-bis(4-hydroxyphenyl) propane, i.e., the diglycidyl ether of 2,2-bis(4-cyclohexanol) propane.

2. Saturated Epoxy Resin B (Resin B): Epon ® Resin 828 was hydrogenated over a rhodium catalyst by the process described in U.S. Pat. No. 3,336,241.

3. Beckamine 21-511: a urea-formaldehyde resin marketed by Reichold Chemical Company supplied at 60%w solids and having a K-M Gardner-Holdt viscosity at 25° C.

4. Cymel 370: a melamine-formaldehyde resin marketed by American Cyanamid supplied at 88%w solids and having a $Z_2$-$Z_4$ Gardner-Holds viscosity at 25° C.

5. Resimene X-745: a melamine-formaldehyde resin marketed by Monsanto supplied at 98%w solids (min.) and having a W-Z Gardner-Holdt viscosity at 25° C.

6. Resimene X-918: a urea-formaldehyde resin marketed by Monsanto supplied at 70%w solids and having a Y-$Z_2$ Gardner-Holdt viscosity at 25° C.

7. Acryloid Resin AT-50: an acrylic/melamine-formaldehyde resin marketed by Rohm and Haas Company supplied at 50%w solids and having a viscosity of 625-1755 cps at 25° C.

8. Irganox 1010: tetrakis [methylene 3-(3',5'-di-tert-butyl-4'-hydroxyphenyl) propionate] methane.

9. Irganox 1035: thiodiethylene bis-(3,5-di-tert-butyl-4-hydroxy) hydrocinnamate.

10. Irganox 1076: octadecyl 3-(3',5'-di-tert-butyl-4'-hydroxyphenyl) propionate.

Epon ® Resin 828 is a diglycidyl ether of 2,2-bis(4-hydroxyphenyl) propane having an average molecular weight of about 380.

Illustrative Embodiment I

This example illustrates the effect of catalyst (PTSA) and stabilizer concentration on the cure and initial gloss of a Resin A/urea-formaldehyde baking enamel.

Baking enamels were prepared using Resin A and Beckamine 21-511 is a weight ratio of 60:40 wherein varying amounts of a catalyst (PTSA) and various stabilizers (antioxidants) were used. The enamel contained $TiO_2$ pigment to produce a pigment: binder ratio of 50:50. The enamel was applied in organic solvent (Cellosolve ® acetate and xylene) to steel panels and baked at 400° F for 10 minutes. The results of these experiments are tabulated in Table I. The control is Resin A without stabilizer. The Yellowness Index was determined by ASTM: E313-67 and the Gloss was determined by ASTM: D523-67, Reapproved 1972, at a 60° angle. The "MEK Rub" test is a test of degree of cure and is a simple test whereby the number of double rubs of a cheesecloth saturated with methyl ethyl ketone (MEK) needed to soften the film is noted. The greater number of rubs indicates a higher degree of cure. The data clearly indicates that at this cure cycle, a catalyst is desirable.

TABLE I

EFFECT OF CATALYST AND ANTIOXIDANT CONCENTRATION ON CURE AND INITIAL GLOSS OF RESIN A/BECKAMINE 21-511

| Antioxidant Concentration %w | Control | | Irganox 1010 0.5% | | Irganox 1010 1.0% | | Irganox 1076 0.5% | |
|---|---|---|---|---|---|---|---|---|
| | Yellowness Index | | Yellowness Index | | Yellowness Index | | Yellowness Index | |
| Catalyst[a] Concentration phr | Gloss % | MEK Rubs | Gloss % | MEK Rubs | Gloss % | MEK Rubs | Gloss % | MEK Rubs |
| 0.25% | +0.89 | 5 | −1.71 | 5 | −1.26 | 7 | −2.38 | 14 |
| | 72 | | 68 | | 70 | | 71 | |
| 0.50% | −0.10 | 99 | −1.22 | 8 | −1.46 | 9 | −0.86 | 12 |
| | 58 | | 79 | | 78 | | 74 | |
| 1.0% | +1.75 | >100 | −2.10 | >100 | −1.82 | >100 | −2.06 | >100 |
| | 53 | | 72 | | 73 | | 66 | |

| Antioxidant Concentration %w | | | Irganox 1076 1.0% | | Irganox 1035 0.5% | | Irganox 1035 1.0% | |
|---|---|---|---|---|---|---|---|---|
| | | | Yellowness Index | | Yellowness Index | | Yellowness Index | |
| Catalyst Concentration phr | | | Gloss % | MEK Rubs | Gloss % | MEK Rubs | Gloss % | MEK Rubs |
| 0.25% | | | −0.57 | 9 | −1.81 | 29 | −1.83 | 9 |
| | | | 79 | | 70 | | 73 | |
| 0.50% | | | −1.31 | 13 | −1.29 | 10 | −1.10 | 10 |
| | | | 72 | | 78 | | 72 | |
| 1.0% | | | −1.97 | >100 | −2.40 | >100 | −1.60 | >100 |
| | | | 68 | | 74 | | 70 | |

[a] p-Toluenesulfonic acid added as a 50% soln in IPA

TABLE II

EFFECT OFF CATALYST AND ANTIOXIDANT CONCENTRATION ON CURE AND INITIAL GLOSS OF RESIN B/BECKAMINE 21-511

| Antioxidant Concentration %w | Control | | Irganox 1010 0.5% | | Irganox 1010 1.0% | | Irganox 1076 0.5% | |
|---|---|---|---|---|---|---|---|---|
| | yellowness Index | | Yellowness Index | | Yellowness Index | | Yellowness Index | |
| Catalyst[a] Concentration phr | Gloss % | MEK Rubs | Gloss % | MEK Rubs | Gloss % | MEK Rubs | Gloss % | MEK Rubs |
| 0.25% | +2.37 | 2 | +0.28 | 2 | −0.23 | 2 | +0.03 | 2 |
| | 83 | | 85 | | 84 | | 83 | |
| 0.50% | +0.53 | 10 | −1.53 | 13 | −1.79 | 6 | −1.53 | 10 |
| | 64 | | 76 | | 63 | | 69 | |
| 1.0% | +0.24 | >100 | −2.39 | >100 | −2.85 | >100 | −1.71 | >100 |
| | 66 | | 72 | | 70 | | 73 | |
| Antioxidant | | | Irganox 1076 | | Irganox 1035 | | Irganox 1035 | |

TABLE II-continued
EFFECT OFF CATALYST AND ANTIOXIDANT CONCENTRATION ON CURE AND INITIAL GLOSS OF RESIN B/BECKAMINE 21-511

| Concentration % w Catalyst[a] Concentration phr | 1.0% Yellowness Index Gloss % | MEK Rubs | 0.5% Yellowness Index Gloss % | MEK Rubs | 1.0% Yellowness Index Gloss % | MEK Rubs |
|---|---|---|---|---|---|---|
| 0.25% | −0.48 / 81 | 3 | −0.29 / 83 | 4 | +0.13 / 86 | 3 |
| 0.50% | −1.54 / 77 | 12 | −2.30 / 64 | 7 | −2.15 / 64 | 10 |
| 1.0% | −2.34 / 70 | >100 | −2.44 / 73 | >100 | −1.40 / 72 | 26 |

[a] p-Toluenesulfonic acid added as a 50% soln in IPA.

TABLE III
SUMMARY OF FLORIDA EXPOSURE DATA ON RESIN A BAKING ENAMELS

| Resin System No. | Resin | Curing Agent | Ratio Resin / Curing Agent | Catalyst / phr |
|---|---|---|---|---|
| 1 | Resin C | Beckamine 21-511 | 60/40 | PTSA/1 |
| 2 | Resin C | Beckamine 21-511 | 60/40 | PTSA/1 |
| 3 | Resin C | Cymel 370 | 60/40 | PTSA/2 |
| 4 | Resin C | Cymel 370 | 60/40 | PTSA/2 |
| 5 | Resin C | Resimene X-745 | 60/40 | PTSA/4 |
| 6 | Resin C | Resimene X-745 | 60/40 | PTSA/4 |
| 7 | Resin C | Resimene X-918 | 60/40 | PTSA/2 |
| 8 | Resin C | Resimene X-918 | 60/40 | PTSA/2 |
| 9 | Duraplex ND-78 | Uformite MX-61 | 65/36 | — |
| 10 | Soya Alkyd | — | — | — |
| 11 | AT-50 | — | — | — |
| 12 | EPON Resin 1007 | Beckamine 21-511 | 70/30 | — |
| 13 | EPON Resin 828 | Beckamine 21-511 | 50/40 | PTSA/1 |
| 14 | EPON Resin 828 | Cymel 370 | 60/40 | PTSA/2 |
| 15 | EPON Resin 828 | AT-50 | 35/65 | — |

| Resin System No. | Bake Schedule Temp °F | Bake Schedule Time Min. | 60 Deg. Gloss, % Months 0 | 3 | 6 | 9 | 12 | 15 | 18 | 21 | Yellowness (N) Months 0 | 21 | ΔN |
|---|---|---|---|---|---|---|---|---|---|---|---|---|---|
| 1 | 400 | 10 | 73 | 72 | 73 | 66 | 64 | — | — | — | −0.20 | — | — |
| 2 | 400 | 10 | 75 | 73 | 77 | 66 | 68 | — | — | — | +0.47 | — | — |
| 3 | 400 | 10 | 85 | 77 | 88 | 74 | 81 | 61 | 47 | 41 | +1.39 | — | +1.93[1] |
| 4 | 400 | 10 | 85 | 78 | 89 | 75 | 81 | 57 | 43 | 39 | +1.35 | — | +4.53[1] |
| 5 | 400 | 10 | 88 | 81 | 86 | 73 | 76 | 51 | 27 | — | −0.64 | — | +5.14[1] |
| 6 | 400 | 10 | 87 | 84 | 87 | 72 | 77 | 49 | 22 | — | −1.37 | — | +5.49[1] |
| 7 | 400 | 10 | 81 | 77 | 77 | 67 | 70 | 26 | — | — | −0.78 | — | +12.40[2] |
| 8 | 400 | 10 | 81 | 80 | 77 | 67 | 69 | 37 | — | — | +0.69 | — | +9.13[2] |
| 9 | 300 | 30 | 89 | 49 | 19 | 29 | 31 | 14 | — | — | −1.34 | — | +2.71[1] |
| 10 | — | — | 88 | 74 | 51 | 48 | 49 | 28 | — | — | +2.33 | — | −0.06[2] |
| 11 | 300 | 30 | 85 | 78 | 94 | 80 | 85 | 54 | 13 | — | −0.97 | — | +1.73[1] |
| 12 | 400 | 10 | 94 | 64 | 23 | 27 | 32 | 16 | — | — | +1.21 | — | +3.22[2] |
| 13 | 400 | 10 | 93 | 75 | 69 | 22 | 19 | 8 | — | — | −0.60 | — | +20.00[2] |
| 14 | 400 | 10 | >100 | 95 | 58 | 21 | 10 | 5 | — | — | +1.37 | — | +6.87[2] |
| 15 | 300 | 30 | 84 | 89 | 88 | 51 | 48 | 32 | 14 | — | +0.49 | — | +8.46[1] |

[1] ΔN after 18 months
[2] ΔN after 15 months

Illustrative Embodiment II

The procedures of Illustrative Embodiment I were essentially repeated wherein Resin B is substituted for Resin A. The results are tabulated in Table II. The control example is Resin B without stabilizer.

Illustrative Embodiment III

This example illustrates weatherability of the present baked coating compositions.

A dispersion containing 62.5% by weight TiO$_2$ and 37.5% by weight of Resin C (Resin A plus 0.5% by weight Irganox 1035) was prepared on a roller mill, hereinafter referred to as "Roller Mill Grind".

This Roller Mill Grind was then formulated into baking enamels as follows:

| A. Enamel A | %wt | Solids (% NV) |
|---|---|---|
| Roller Mill Grind | 59.1 | |
| Cymel 370 (88%) | 16.8 | |
| Cellosolve Acetate/Xylene (50/50) | 22.6 | |
| p-Toluenesulfonic Acid (50% IPA) | 1.5 | |
| | 100.0 | 73.9 |
| B. Enamel B | | |
| Roller Mill Grind | 59.6 | |
| Beckamine 21-511 (60%) | 24.8 | |
| Cellosolve Acetate/Xylene (50/50) | 14.9 | |
| p-Toluenesulfonic Acid (50% IPA) | 0.7 | |
| | 100.0 | 74.5 |
| C. Enamel C | | |
| Roller Mill Grind | 58.3 | |
| Resimene X-745 (98%) | 14.6 | |

-continued

| | | |
|---|---|---|
| Cellosolve Acetate/Xylene (50/50) | 24.2 | |
| p-Toluenesulfonic Acid (50% IPA) | 2.9 | |
| | 100.0 | 72.9 |
| D. Enamel D | | |
| Roller Mill Grind | 60 | |
| Resimene X-918 (70%) | 21.4 | |
| Cellosolve Acetate/Xylene (50/50) | 17.1 | |
| p-Toluenesulfonic Acid (50% IPA) | 1.5 | |
| | 100.0 | 75% |

The resulting enamels were applied by doctor blade (1.0 mil coatings) to cold rolled steel panels and cured at 400° F for 10 minutes. The cured coated panels were then exposed to the weather in Florida. The results of selected representative test panels are tabulated in Table III. For comparison a number of control samples are also tabulated wherein various other resin systems were employed.

Illustrative Embodiment IV

The procedures of Embodiment III were essentially repeated wherein an antioxidant (Irganox 1035) is used alone and in combination with a UV-stabilizer (Tinuvin 327) in Resin A. For comparison, films of a commerical resin system were also used (ACRYLOID AT-50). The weathering results are tabulated in Table IV.

TABLE IV

EFFECT OF STABILIZERS ON THE WEATHERING OF RESIN A/CYMEL 370 BAKED ENAMELS

| Resin System | | Ratio | Stabilizer System | | |
|---|---|---|---|---|---|
| Resin | Curing Agent | Curing Agent | Catalyst (PTSA) phr | Anti-Oxidant | UV$_1$ Stabilizer |
| Resin A | Cymel 370 | 60/40 | 2 | Irganox[a] 1035 | — |
| Resin A | Cymel 370 | 60/40 | 2 | Irganox[a] 1035 | Tinuvin 327[a] |
| ACRYLOID AT-50 | — | — | — | — | — |

| Resin System | | FLORIDA EXPOSURE 60° Gloss, % Retention Months | | | | | |
|---|---|---|---|---|---|---|---|
| Resin | Curing Agent | 3 | 6 | 9 | 12 | 15 | 18 |
| Resin A | Cymel 370 | 91 | 104 | 88 | 95 | 69 | 53 |
| Resin A | Cymel 370 | 94 | 105 | 91 | 102 | 84 | 68 |
| ACRYLOID AT-50 | — | 95 | 111 | 94 | 101 | 68 | 20 |

[a]0.5% by weight based on Resin A

Illustrative Embodiment V

This embodiment illlustrates the effect of selected antioxidants on weight loss.

A drop of Resin A (above-defined) was placed in a weighed aluminum cup and methyl ethyl ketone (MEK) was added to dispense the resin. The MEK solvent was then evaporated at room temperature to form a film of from about 0.2 to 0.3 mils thickness. The cup was then placed in an oven at 400° F for 10 minutes. The weight loss was then determined and reported as percent non-volatiles.

This procedure was repeated using Resin B. Then 1% by weight of selected antioxidants were added to the resin and the procedure essentially repeated. The results are tabulated in Table V. In all instances, except when Ionol ® was used, the weight loss was reduced when antioxidant was used. Since Ionol is somewhat volatile, it is predictable that some weight loss would be experienced; however, the gloss and weatherability is improved when Ionol is used.

Illustrative Embodiment VI

Related results were obtained when Plastinox 1729, a white phenolic, sulfur-containing polyolefin antioxidant (American Cyanamide Co.) having a melting point; soluble in acetone, ethanol, methyl ethyl ketone and tetrahydrofuran; but insoluble in water, is incorporated in the saturated epoxy resins.

TABLE V

EFFECT OF SELECTED ANTIOXIDANTS ON WEIGHT LOSS OF SATURATED EPOXY RESINS

| Resin | Control %, NV[a] | Irganox 1010 %NV | Irganox 1035 %NV | Irganox 1076 %NV | Ionol[b] %NV | Poly-gard[c] %NV | DLTDP[d] %NV | HITEC[e] E653 %NV |
|---|---|---|---|---|---|---|---|---|
| Resin A | 70 | 79 | 87 | 82 | 66 | 83 | 71 | 76 |
| Resin B | 86 | 92 | 91 | 94 | 79 | 92 | 91 | 84 |

[a]Percent Non-volatiles
[b]2,6-di-tert-butyl-p-cresol
[c]Trinonyl phenylphosphate (Uniroyal)
[d]Zinc dialkyl dithiophosphate (Edwin Cooper, Inc.)

What is claimed is:

1. A heat-curable composition comprising (1) a glycidyl ether of a polyhydric phenol having at least one vicinal epoxy group and wherein the carbon-to-carbon bonds within the six-membered phenolic group are saturated, (2) a curing amount of an urea-formaldehyde or melamine-formaldehyde resin and (3) from about 0.01 to about 5.0 parts per hundred parts by weight of the glycidyl ether of at least one stabilizer selected from the group consisting of actinic stabilizers and heat stabilizers.

2. The composition of claim 1 wherein the glycidyl ether is a hydrogenated diglycidyl ether of 2,2-bis(4-hydroxyphenyl) propane.

3. The composition of claim 1 wherein the glycidyl ether is derived from a hydrogenated polyhydric phenol.

4. The composition of claim 1 wherein the heat stabilizer is a sterically hindered phenol.

5. The composition of claim 4 wherein the sterically hindered phenol is tetrakis [methylene 3-(3′,5′-di-tert-butyl-4′-hydroxyphenol) propionate] methane.

6. The composition of claim 4 wherein the sterically hindered phenol is thiodiethylene bis-(3,5-di-tert-butyl-4′-hydroxy) hydrocinnamate.

7. The composition of claim 4 wherein the sterically hindered phenol is octadecyl 3-(3′,5′-di-tert-butyl-4′-hydroxyphenyl) propionate.

8. The composition of claim 1 wherein the actinic stabilizer is a chlorobenzotriazole.

9. The composition of claim 8 wherein the chlorobenzotriazole is 2-(3′,5′-ditert-butyl-2′-hydroxyphenyl)5-chlorobenzotriazole.

* * * * *